United States Patent
Rinke

(10) Patent No.: US 9,803,732 B2
(45) Date of Patent: Oct. 31, 2017

(54) HARD STOP ASSEMBLY FOR A JOINT ADAPTED FOR MORE THAN A SINGLE REVOLUTION

(71) Applicant: DISNEY ENTERPRISES, INC., Burbank, CA (US)

(72) Inventor: Tanner J. Rinke, Sherman Oaks, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 202 days.

(21) Appl. No.: 14/944,923

(22) Filed: Nov. 18, 2015

(65) Prior Publication Data

US 2017/0138447 A1 May 18, 2017

(51) Int. Cl.
*B23Q 16/00* (2006.01)
*F16H 27/06* (2006.01)
*A63J 19/00* (2006.01)
*A63H 31/00* (2006.01)

(52) U.S. Cl.
CPC .............. *F16H 27/06* (2013.01); *A63H 31/00* (2013.01); *A63J 19/00* (2013.01); *A63J 19/006* (2013.01)

(58) Field of Classification Search
CPC .......... F16H 27/06; F16H 27/08; F16H 27/10; A63H 19/00; A63H 19/006; A63H 31/00; A63J 19/00; A63J 19/006
See application file for complete search history.

(56) References Cited

U.S. PATENT DOCUMENTS

| 2,512,894 A * | 6/1950 | Gieskieng ............... F16H 27/06 74/436 |
|---|---|---|
| 2,532,627 A | 12/1950 | Koci |
| 2,872,553 A | 2/1959 | Hatfield |
| 2,918,157 A | 12/1959 | Nichols et al. |
| 3,015,793 A | 1/1962 | Fraser et al. |
| 3,203,262 A | 8/1965 | Beer |
| 3,662,610 A | 5/1972 | Thoen |
| 3,777,591 A | 12/1973 | Thomasian |
| 3,990,314 A | 11/1976 | Priest |
| 4,493,498 A | 1/1985 | Vansteelant |
| 4,860,414 A | 8/1989 | Bishop et al. |

(Continued)

FOREIGN PATENT DOCUMENTS

| EP | 0257299 B1 | 5/1992 |
| JP | H0320114 A | 3/1991 |

*Primary Examiner* — Adam D Rogers
(74) *Attorney, Agent, or Firm* — Marsh Fischmann & Breyfogle LLP; Kent A. Lembke

(57) ABSTRACT

A rotating joint assembly such as an interface device in a master device or remote manipulator for a puppeteering device or other mechanical system operating in response to operator input and requiring more than 360 degrees of rotation. The rotating joint assembly includes a hard stop assembly that limits the rotation of its rotating component(s) to a predefined maximum amount of rotation such as to less than two full revolutions, e.g., some rotation amount between 360 and 720 degrees. The hard stop assembly includes a Geneva drive body or driven wheel with a hard stop body rigidly coupled with the Geneva drive body to rotate it between a disengaged position (during the first revolution) and one of two engaged positions by rotation of an inner ring (at some point during the second revolution in either direction).

18 Claims, 8 Drawing Sheets

(56) References Cited

U.S. PATENT DOCUMENTS

| | | | | |
|---|---|---|---|---|
| 4,932,511 | A | 6/1990 | Ames | |
| 5,165,295 | A * | 11/1992 | Dohnal | F16H 27/06 |
| | | | | 200/11 TC |
| 7,765,707 | B2 | 8/2010 | Tomelleri | |
| 8,371,760 | B2 | 2/2013 | Stolzle Jurgen | |
| 8,887,831 | B2 * | 11/2014 | Zhang | B23B 39/00 |
| | | | | 173/216 |

* cited by examiner

HARD STOP ASSEMBLY FOR A JOINT ADAPTED FOR MORE THAN A SINGLE REVOLUTION

BACKGROUND

1. Field of the Description

The present invention relates, in general, to hard stops for rotatable joints, and, more particularly, to a hard stop assembly adapted to define a maximum amount of rotation in either direction for a joint adapted and used for rotations greater than 360 degrees (or for more than a single revolution about a rotation axis).

2. Relevant Background

There are many applications where a mechanical device is allowed to rotate more than a full revolution or more than 360 degrees about a rotation axis. For example, there are human operator-to-mechanical system interfaces that are used to translate movement of a human operator's wrist (or other body part) and, in some cases, a master device or remote manipulator into movements or instructions for functionality to a mechanical system. A specific example is a wrist-mounted interface that is ring shaped for a puppeteering device (e.g., an exemplary master device or remote manipulator), with rotational movement of the operator's wrist being measured, tracked, and used as input for the puppeteering device to cause a puppet to move in a particular manner.

Due to the high range of motion of the operator's wrist and of the master device (or remote manipulator) in this exemplary and other examples of rotating mechanical devices, there is a need for a rotating joint (e.g., a rotating wrist) design that allows for more than one revolution (or more than 360 degrees of rotation). A challenge with such rotating mechanical devices, though, is that too much rotation may be undesirable. In the puppeteering or remote manipulator implementation, for example, sensing equipment such as a potentiometer may be provided near or attached to a rotation component (e.g., an inner ring) of the joint, and this sensing equipment may be subject to damage if the joint is "over rotated" such as a rotation through 2, 3, or more revolutions.

Hence, there remains a need for rotation mechanisms that may be used in a variety of settings to provide a rotation range greater than 360 degrees, such as for a rotating wrist joint (or similar human-operator interface apparatus) and that are specially adapted with some form of positive stop in order to prevent over rotation (e.g., prevent 1.5 to 3 revolutions or the like or some other maximum rotation) to prevent over-travel of sensing equipment or wiring on-board the rotation mechanism.

SUMMARY

Briefly, the inventor recognized that many rotation mechanisms would benefit from the inclusion of a hard stop (e.g., a mechanical device that limits the travel/rotation of the rotation mechanism about a rotation axis) to prevent rotation at some predefined rotation amount beyond one revolution or 360 degrees. For example, a rotating joint assembly (e.g., a wrist joint assembly) may be provided that can be used as an input interface, operable by a human operator, in a master device or remote manipulator for a puppeteering device or other mechanical system operating in response to operator input. The rotating joint assembly includes a hard stop assembly that limits the rotation of its rotating component(s) to a predefined maximum amount of rotation such as to less than two full revolutions (e.g., less than 720 degrees or some value between 360 and 720 degrees). In some embodiments, the hard stop assembly provides this limit to over rotation (or over travel) in both the clockwise and counterclockwise directions of rotation.

More particularly, a rotating joint assembly is provided such as a rotating wrist joint assembly for a remote manipulator. The joint assembly includes an outer support member (e.g., an outer support ring) and an inner joint member (e.g., an inner ring). The inner joint member is positioned centrally within the outer support member and pivotally coupled with the outer support member to be selectively rotated about a rotation axis passing through the center of the inner joint member. The joint assembly also includes a hard stop assembly that includes: (a) a circular track, on a surface of the inner joint member, with a guide surface facing outward toward the outer support member; (b) a Geneva drive body (or driven wheel) with three arms each with a contact surface for contacting the guide surface of the circular track and with adjacent pairs of the arms being separated by a slot in the Geneva drive body (and the Geneva drive body is pivotally coupled with the outer support member); (c) a hard stop body with a pair of arms each with a contact surface (and the hard stop body is rigidly coupled to or integrally formed with the Geneva drive body; (d) an engagement pin on the surface of the inner joint member positioned and configured to engage and rotate the Geneva drive body via the slots with rotation of the inner joint member; and (e) a pair of hard stop posts angularly offset in opposite directions from the engagement pin by an offset angle.

In practice, the hard stop posts are each positioned and configured to physically abut one of the contact surfaces of one of the arms of the hard stop body during rotation of the inner joint member in one of the clockwise and counterclockwise directions. In some implementations, the arms of the hard stop body are offset by 180 degrees, and the Geneva drive body is disposed between the hard stop body and the outer support member. Further, the Geneva drive body may be oriented relative to the hard stop body such that a first one of the arms of the Geneva drive body is positioned adjacent a first one of the arms of the hard stop body, a second one of the arms of the Geneva drive body is coupled with (or formed integral to, in some cases) a second one of the arms of the hard stop body, and a third one of the arms of the Geneva drive body extends outward between the first and second arms of the Geneva drive body. Still further, the adjacent pairs of arms of the Geneva drive body may be offset from each other by 90 degrees.

In some embodiments of the joint assembly, the Geneva drive body is first positionable in a disengaged position with the contact surface of a middle one of the three arms contacting the guide surface. With the Geneva drive body in the disengaged position, the contact surfaces of the arms of the hard stop body are spaced apart from a travel path of the hard stop posts during rotation of the inner joint member. Also, the Geneva drive body is second positionable in an engaged position with the contact surface of one of the outer two of the three arms contacting the guide surface. Then, with the Geneva drive body in the engaged position, the contact surface of the one of the outer two of the three arms is in the travel path of one of the hard stop posts during rotation of the inner joint member. The Geneva drive body can then be rotated into the engaged position by rotation of the inner joint member when the engagement pin rotates into one of the slots. The guide surface of the circular track includes a recessed surface, proximate the engagement pin, for receiving a portion of one of the three arms of the Geneva drive body during the rotation of the Geneva drive body.

In the same or other embodiments, the engagement pin and the hard stop posts can be positioned at locations on the surface of the inner joint member whereby the Geneva drive body is positioned into the engaged position with rotation in the range of 360 to 720 degrees of the inner joint member. To provide desired hard stops, each of the hard stop posts can be angularly offset from the engagement pin by an offset angle in the range of 10 and 180 degrees.

DETAILED DESCRIPTION

Briefly, a rotating joint assembly is described that includes a hard stop assembly to positively limit rotation of a rotatable member (e.g., an inner joint member such as a rotatable ring). The rotatable member is able to rotate about a rotation axis through a full revolution (or 360 degrees) but is prevented by the hard stop assembly at some point such that the second revolution is only a partial revolution (such as at 180 degrees to provide a maximum rotation of 540 degrees or another maximum rotation may be controlled with the hard stop assembly). The hard stop assembly is, in some embodiments, adapted to allow an equal amount of revolution in both directions (e.g., 540 degrees or other useful maximum revolution that is greater than 360 degrees in the clockwise and counterclockwise directions). The rotating joint assembly may be implemented in a wide variety of mechanical systems such as part of a remote manipulator, which may include a rotating wrist joint such as in a master device for a puppeteering system.

The hard stop assembly builds upon (or uses) a Geneva drive or mechanism to create an intermittent hard stop. As will become clear, the Geneva drive-based hard stop assembly allows the hard stop body or member to be placed in a disengaged position during the normal (or first) 360 degrees of rotation of the rotatable member, but the hard stop body or member is moved by rotation of a Geneva cam or driven wheel to an engaged position after the joint rotates past 360 degrees in either direction (clockwise or counterclockwise). The Geneva cam or driven wheel rotates about a pivotal mount on a support member in the joint assembly (e.g., a support for the rotatable member (which may be a ring in a rotating wrist joint assembly implementation)).

To this end, the rotatable member of the joint assembly acts as the drive wheel for the Geneva cam or driven wheel with a pin/post to selectively engage and drive/rotate the Geneva cam or driven wheel into the engaged position. A pin/post (in either direction) is provided on the rotatable member to engage a receiving (or contact) surface on the hard stop body after a predefined additional rotation (after the hard stop body is rotated into the engaged position), e.g., an additional 1 to nearly 360 degrees or the like may be provided (with some embodiments using the range of 30 to 90 degrees of additional travel) via an angular offset of the hard stop pins/posts from the Geneva cam-engagement pin/post on the rotatable member (e.g., inner ring of wrist joint assembly).

Figure 1:
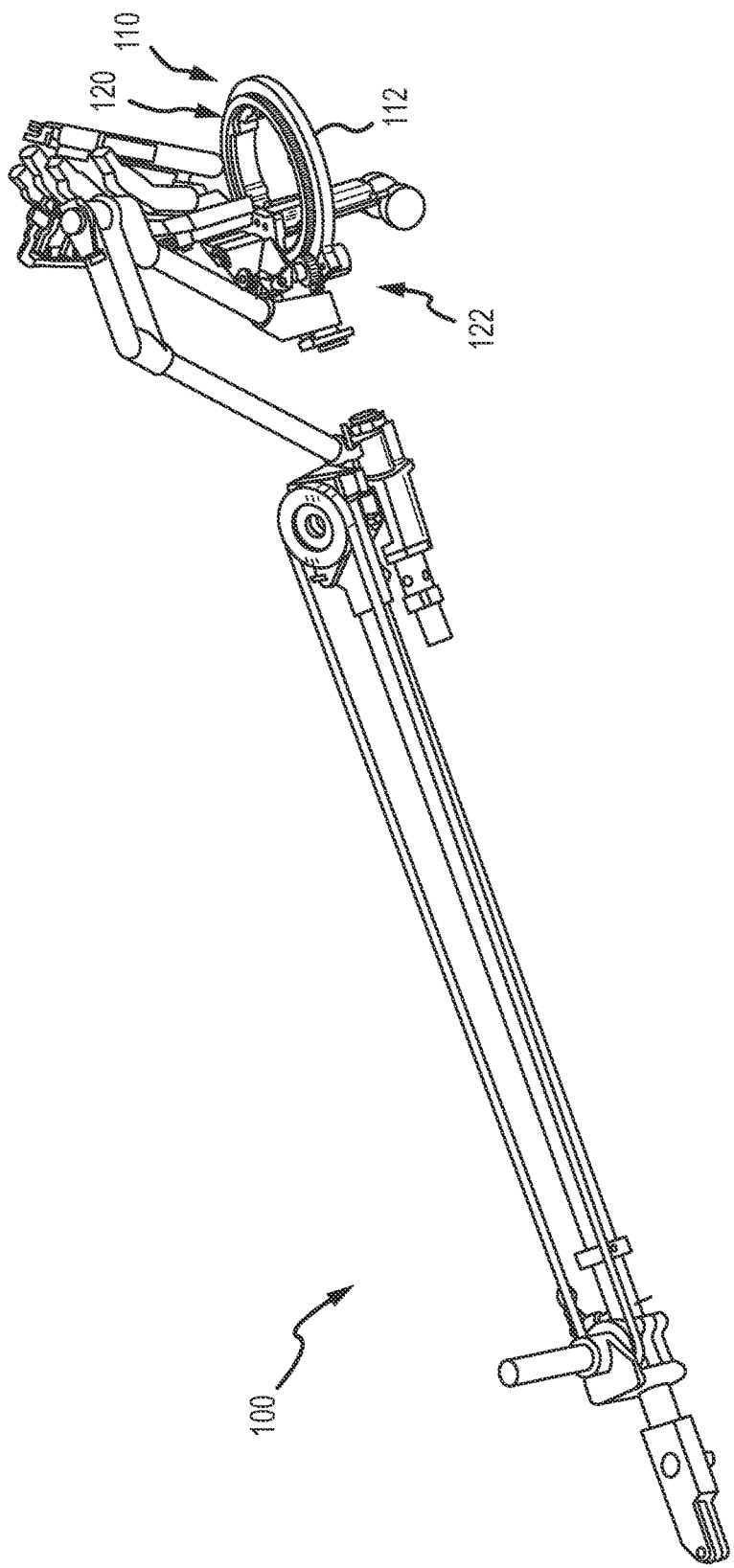
FIG. 1 illustrates a side perspective view of a remote manipulator system with a rotating joint assembly (e.g., a wrist joint) with a hard stop assembly of the present description.
Figure 2:
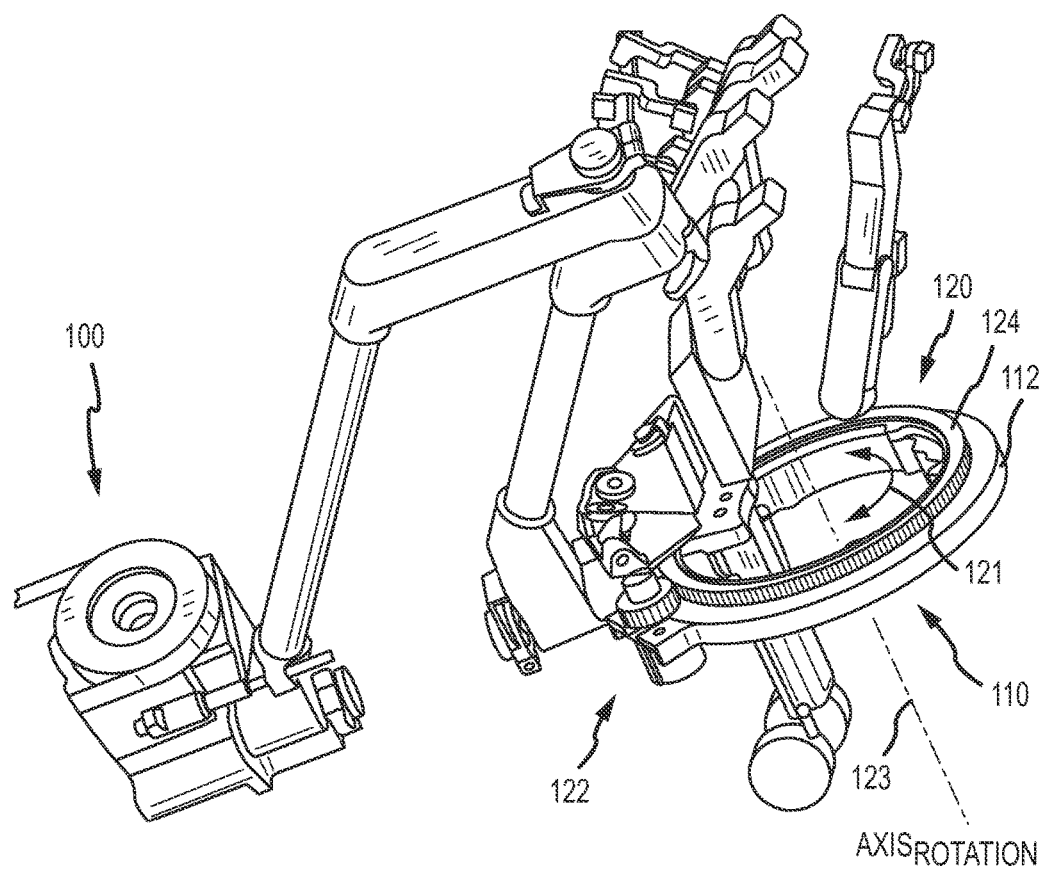
FIG. 2 is a partial top view of the remote manipulator system of FIG. 1 providing greater detail for the rotating wrist assembly and its hard stop assembly.
Figure 3:
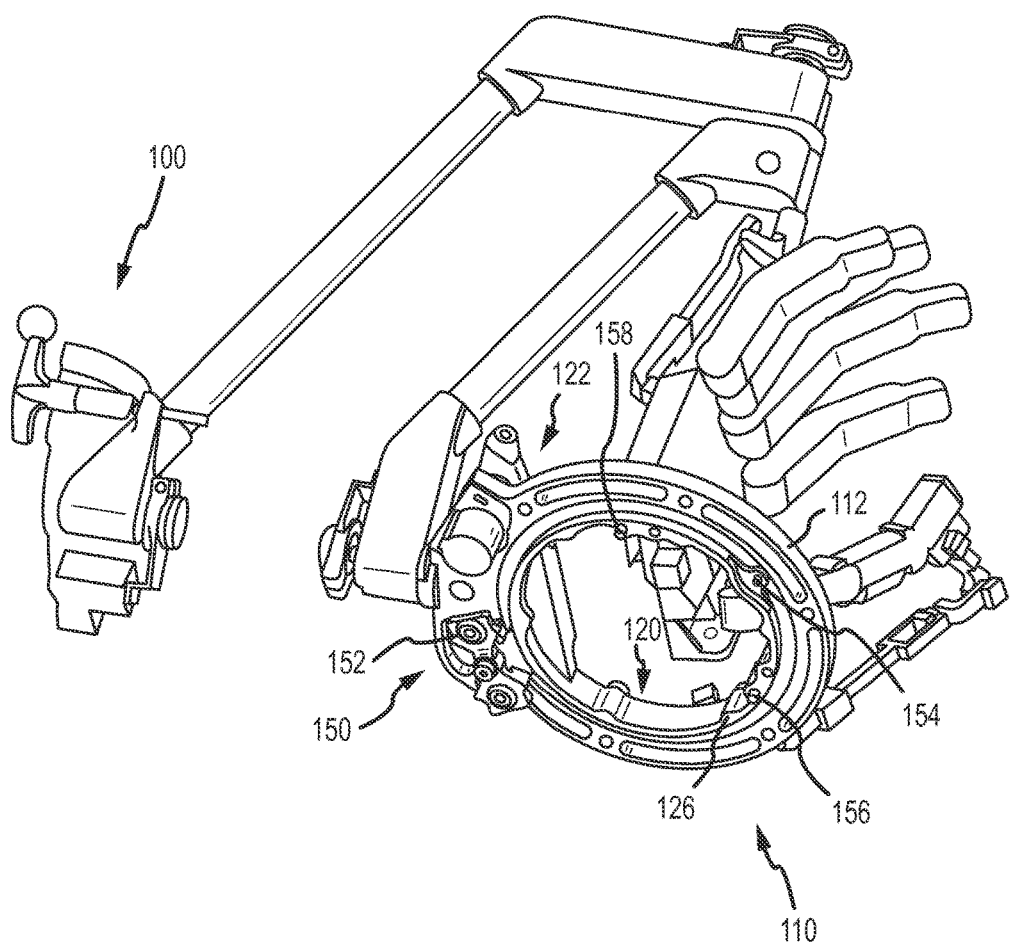
FIG. 3 is partial bottom view of the remote manipulator system of FIGS. 1 and 2 providing different details for the rotating wrist assembly and its hard stop assembly than FIG. 2.

FIG. 1 illustrates a side perspective view of a remote manipulator system 100 with a rotating joint assembly (e.g., a wrist joint) 110 with a hard stop assembly of the present description (shown at 150 in FIG. 3). FIG. 2 is a partial top view of the remote manipulator system 100 of FIG. 1 providing greater detail for the rotating wrist assembly 110. FIG. 3 is partial bottom view of the remote manipulator system 100 of FIGS. 1 and 2 providing more and/or different details for the rotating wrist assembly 110 and its hard stop assembly 150 than FIGS. 1 and 2.

As shown in FIG. 1, the remote manipulator system 100 includes an interface for a human operator that includes a rotating joint assembly 110, such as a rotating wrist joint assembly, and the system 100 may take the form of a master device for a puppeteering system. The joint assembly 110 is shown to include a fixed (or stationary or non-rotatable) outer support ring 112 upon which is mounted an inner ring 120 that is supported by the outer support ring 112 such that it can freely rotate such as upon bearing surfaces abutting outer surfaces of the inner ring 120. A sensor assembly 122 is provided in the remote manipulator system 100 proximate to (or as part of) the rotating joint assembly 110 and is designed to measure (such as with a potentiometer) rotation of the inner ring 120 (e.g., when the system 100 is operated by a human operator (not shown)).

With reference to FIG. 2, the rotating joint assembly 110 is shown in more detail with the inner ring 120 supported by a radial bearing between itself and the outer support ring 112. The inner ring 120 is rotatable (e.g., via human operator wrist movements) to rotate as shown with arrows 121 in either direct (clockwise or counterclockwise) about a rotation axis, $Axis_{Rotation}$, extending, as shown with line 123, through a center of the rings 112, 120 (e.g., the axis 123 may extend orthogonal to a plane containing the rings 112, 120). The inner ring has an upper (or first) surface 124 with a gear with teeth facing outward to mesh with teeth of a potentiometer or other sensing mechanisms of sensor assembly 122. In some implementations of the system 100, the sensor assembly 122 can be damaged by over-rotation (e.g., rotation greater than 2 full revolutions 121 about axis, $Axis_{Rotation}$, for example but not a limitation) of the inner ring 120.

As shown in FIG. 3, to protect the sensor assembly 122 and limit rotation of the inner ring 120, the rotating joint assembly 110 includes a hard stop assembly 150. A useful design for such a hard stop assembly is explained in more detail beginning with FIG. 4. However, it can be seen in FIG. 3 that the hard stop assembly 150 includes a hard stop member or body 152, shown in a disengaged position, that is pivotally supported on the outer support ring 112 and located adjacent the inner ring 120. The inner ring 120 includes a lower (or second) surface 126 opposite the upper (or first) surface 124 and the toothed gear.

Upon this lower (or second) surface 126, the hard stop assembly 150 includes a pin or post 154 that extends upward a distance from the surface 126, and the pin/post 154 may be thought of as a Geneva drive engagement element as it is located on the surface 126 of the inner ring and sized (with its diameter and height) to engage and rotate a Geneva body or driven wheel (not readily visible in FIG. 3 but rigidly attached to or integrally formed with the hard stop member or body 152). In this regard, the inner ring 120 may be considered the drive wheel for the Geneva drive-based hard stop assembly 150 as its rotation (shown with arrows 121 about the rotation axis, $Axis_{Rotation}$) along with engagement pin/post 154 engages and drives rotation of the assembly Geneva body and rigid linked hard stop member or body 152. The pin/post 154 is used to selectively (or after a predefined amount of rotation 121 of the inner ring 120) drive or rotate the hard stop member or body 152 (via the not shown Geneva body or member) into an engaged position with the inner ring 120 (or a guide track or groove on the surface 126).

The hard stop assembly 150 further includes a pair of hard stop posts 156 and 158 that are angularly offset at some angle (such as 15 to 90 degrees but nearly any angle up to 360 degrees may be used) from the engagement pin 154. These posts 156, 158 extend upward from the bottom or second surface 126 of the inner ring 120 and are located (as well as shaped and sized (with a desired height)) to engage one of two contact surfaces on a lobe or arm of the hard stop body or member 152 when the hard stop body or member 152 is in the engaged position relative to the inner ring's guide track/groove and the inner ring 120 has rotated a particular additional amount after hard stop engagement such as more than the angular offset from the engagement pin 154, with one post 156 or 158 engaging the hard stop body 152 during clockwise rotation of the inner ring 120 and one post 158 or 156 engaging the hard stop body 152 during counterclockwise motion. In this way, the number of revolutions or amount of revolution of the inner ring 120 is limited by the hard stop assembly 150 in either rotation direction (e.g., to an angular rotation between 360 and 720 degrees or between a single full revolution and a second full revolution).

Figure 4:
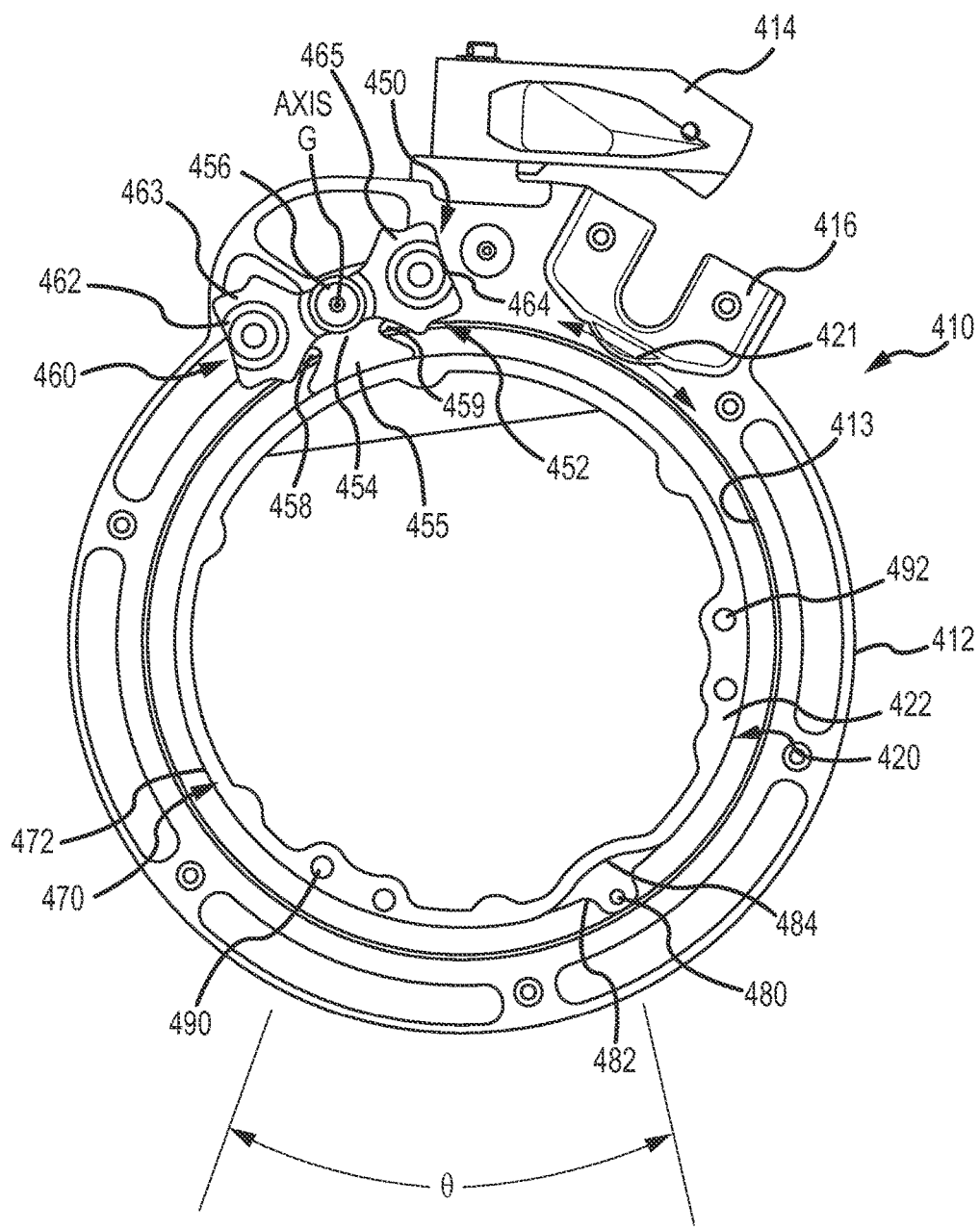
FIG. 4 is a side view of an exemplary rotating joint assembly with a hard stop assembly with the hard stop body of the hard stop assembly in a disengaged position.
Figure 5:
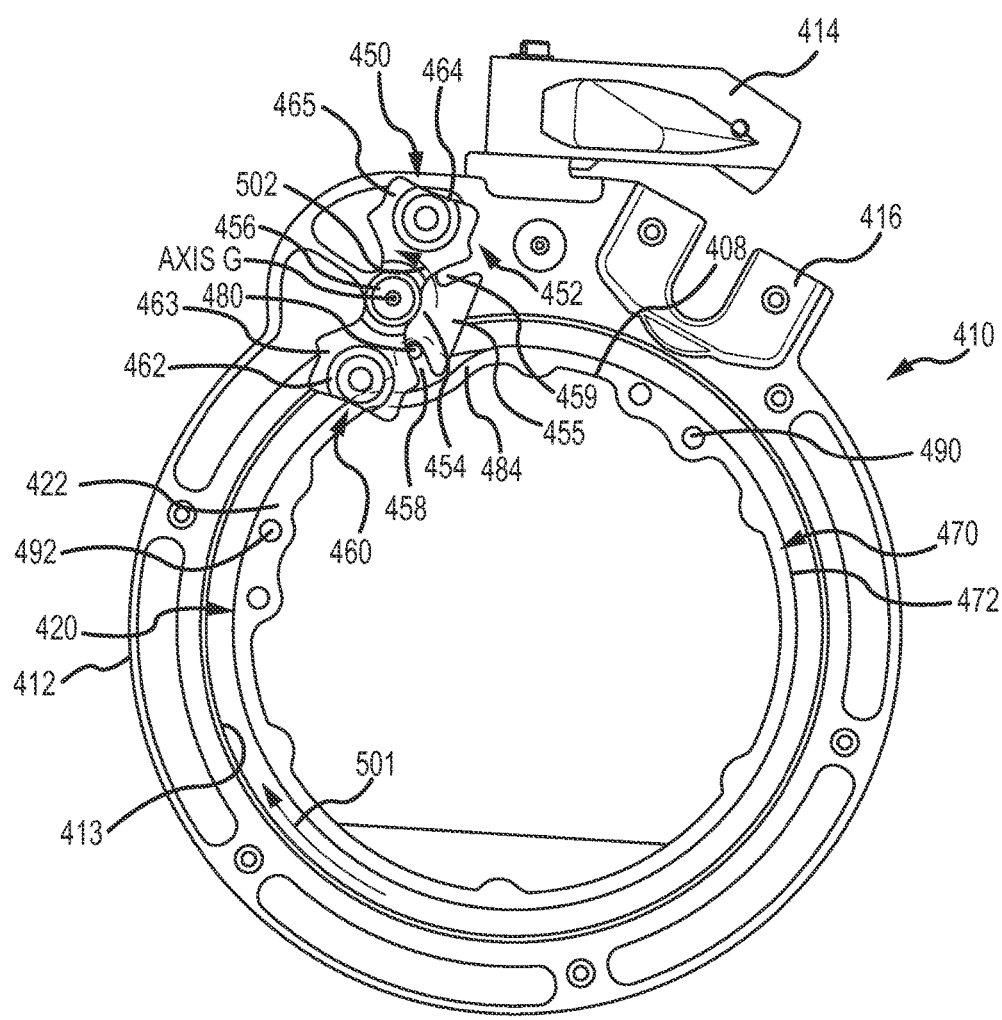
FIG. 5 is a side view of the rotating joint assembly of FIG. 4 after rotation in a clockwise direction with an engagement pin engaging the Geneva body (or driven wheel) to rotate the hard stop body or member toward the engaged position.
Figure 6:
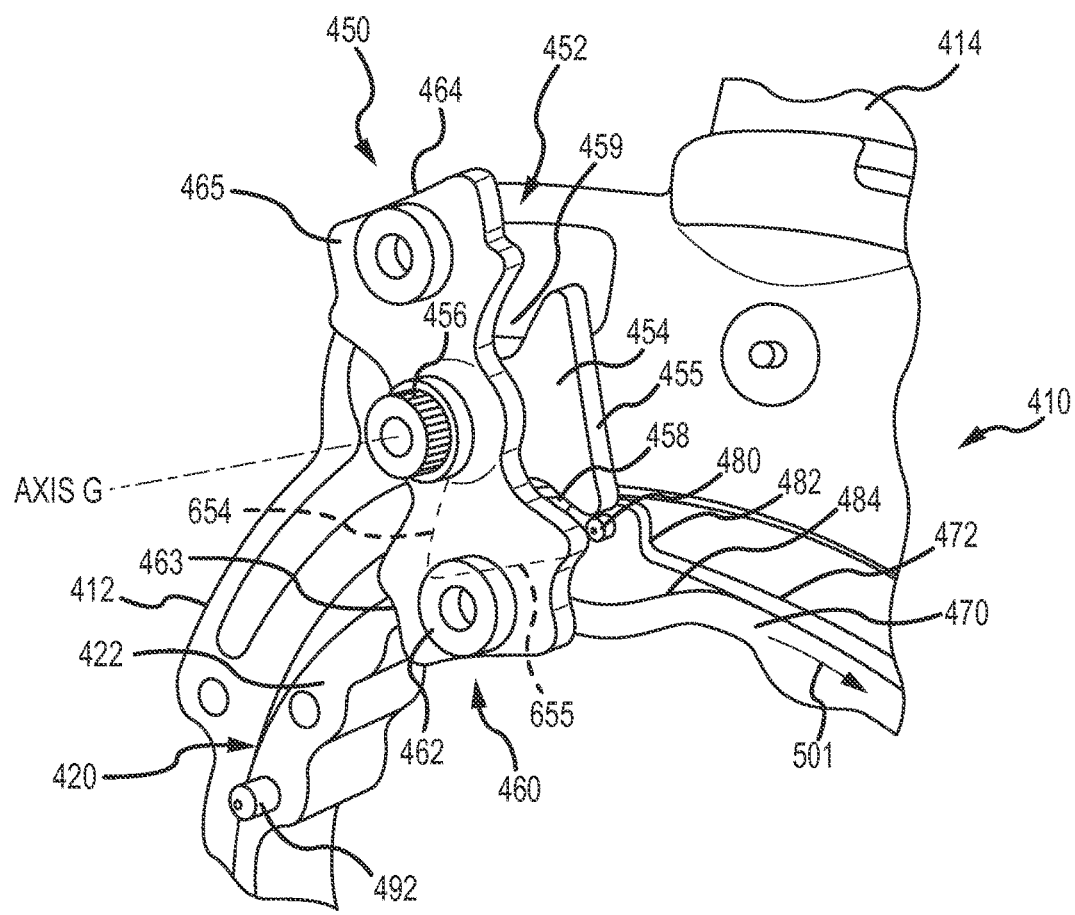
FIG. 6 is an enlarged partial view of the rotating joint assembly of FIGS. 4 and 5 after further rotation of the inner ring to position the hard stop body or member in the engaged position.
Figure 7:
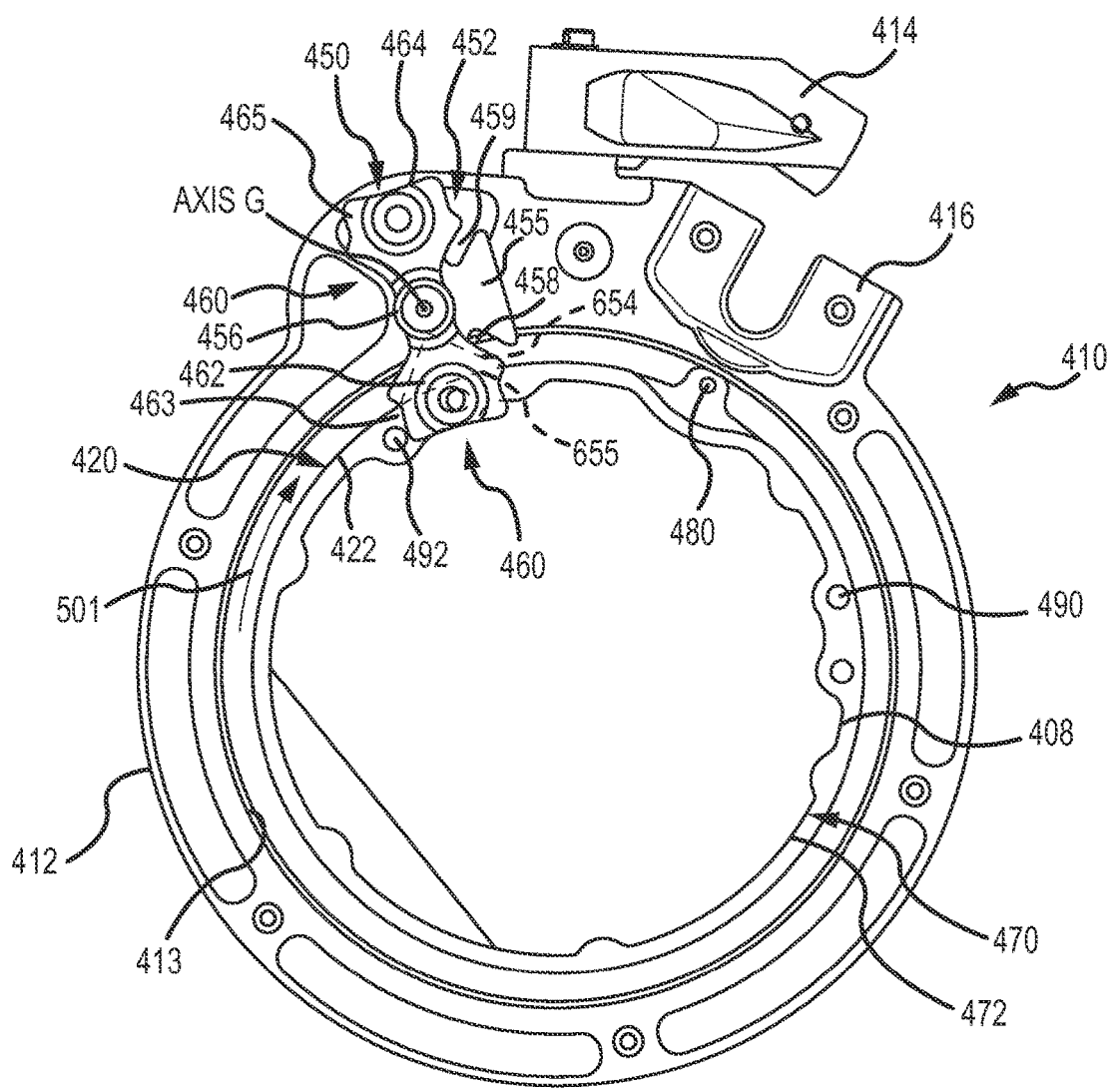
FIG. 7 is a side view of the rotating joint assembly of FIGS. 4-6 after additional rotation of the inner ring to its maximum amount of rotation (or maximum number of revolutions) with a clockwise hard stop post abutting a contact surface on a lobe or arm of the hard stop body or member limiting any further clockwise rotation.
Figure 8:
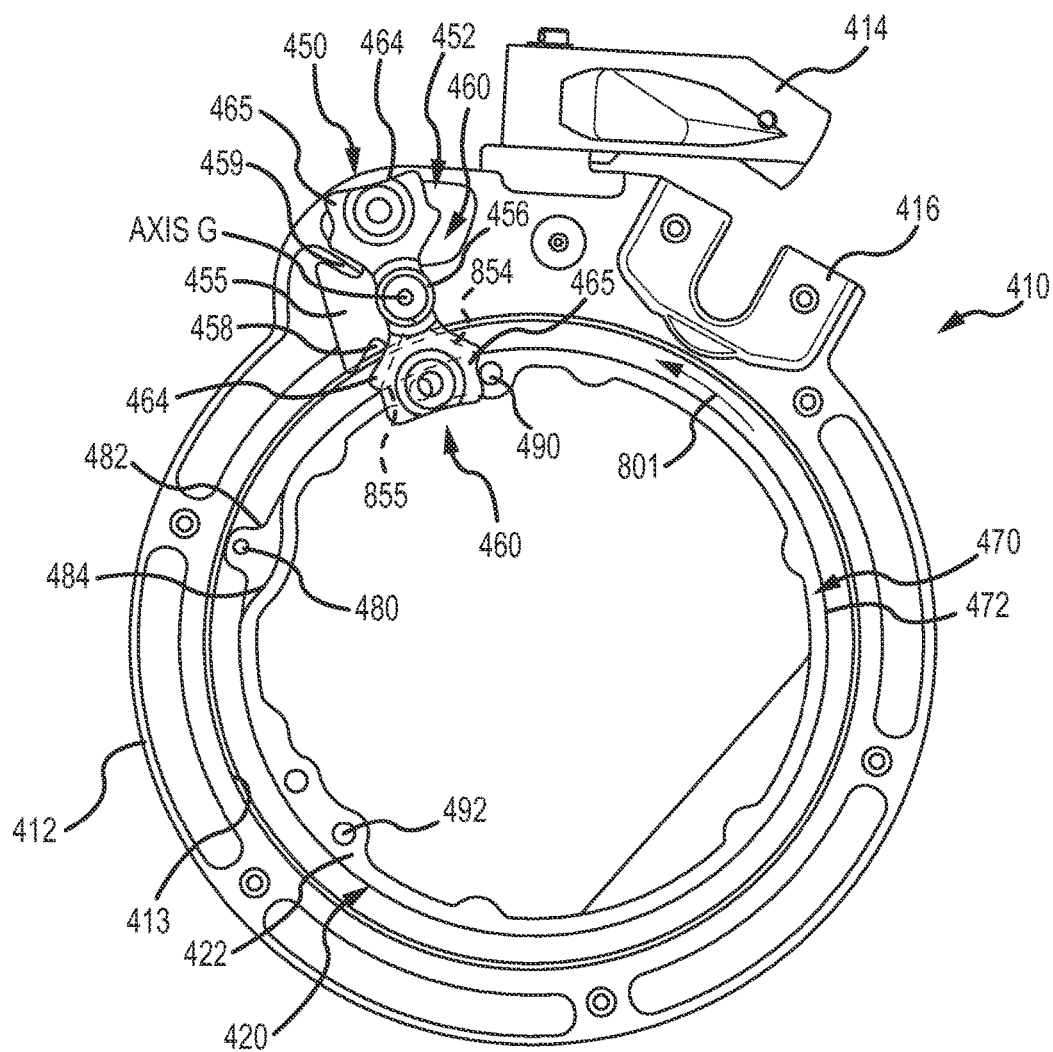
FIG. 8 is a side view of the rotating assembly similar to FIG. 7 but after full rotation (or maximum number of revolutions) in the opposite or counterclockwise direction causing the counterclockwise hard stop post to abut a contact surface on a different lobe or arm of the hard stop body or member limiting any further counterclockwise rotation.

FIG. 4 is a side view of an exemplary rotating joint assembly 410, extending from a connector 414 to a manipulator arm (not shown in FIG. 4), with a hard stop assembly 450 with a hard stop body 460 of the hard stop assembly 450 in a disengaged position. FIG. 5 is a side view of the rotating joint assembly 410 of FIG. 4 after rotation in a clockwise direction with an engagement pin 480 engaging the Geneva body (or driven wheel) 452 to rotate the hard stop body or member 460 toward the engaged position with the inner ring 420. FIG. 6 is an enlarged partial view of the rotating joint assembly 410 of FIGS. 4 and 5 after further rotation of the inner ring 420 to position the hard stop body or member 460 in the engaged position. FIG. 7 is a side view of the rotating joint assembly 410 of FIGS. 4-6 after additional rotation of the inner ring 420 to its maximum amount of rotation (or maximum number of revolutions such as some number greater than 1 revolution) with a clockwise hard stop post 492 abutting a contact surface 463 on a lobe or arm 462 of the hard stop body or member 460 limiting any further clockwise rotation of the inner ring 420. FIG. 8 is a side view of the rotating assembly 410 similar to FIG. 7 but after full rotation (or maximum number of revolutions) in the opposite or counterclockwise direction causing the counterclockwise hard stop post 490 to abut a contact surface 465 on a different lobe or arm 464 of the hard stop body or member 460 limiting any further counterclockwise rotation of the inner ring 420.

With reference first to FIG. 4, the joint assembly 410 includes an outer support ring (or simply outer support or support member) 412 with an inner bearing or coupling surface 413 that supports an inner ring 420. On the outer support 412, the inner ring 420 is able to rotate (such as in response to a wrist rotation of a human operator) about its rotation axis (e.g., through at least one full revolution or 360 degrees but less than some preset maximum amount of rotation such as less than 720 degrees) as shown with arrow 421 in either a clockwise or counterclockwise direction. The outer support 412 may be, in turn, supported by or interconnected with other structure (not shown) such as portions of a remote manipulator mechanism (as shown in FIGS. 1-3 for assembly 110), and a mounting bracket 416 may be provided for attaching rotation sensors or a sensor assembly (as discussed with reference to FIGS. 1-3), which may measure rotation via structure (e.g., gear teeth) provided on a first or upper surface (not shown) of the inner ring 420 (not shown) opposite the second or bottom surface 422.

To limit rotation (or set maximum rotation amounts to prevent over rotation) of the inner ring 420, the joint assembly 410 includes a hard stop assembly 450. As discussed above, the hard stop assembly 450 uses Geneva drive or mechanism techniques to provide a hard stop that allows more than 360 degrees of rotation in either direction. Geneva drives are commonly used to intermittently rotate a driven wheel with a drive wheel such as in conventional film projectors (e.g., to place each frame in front of the projection light sources for a desired length of time prior to driving the driven wheel to advance to a next frame). Interestingly, the inventor recognized from his experience with such projectors that a Geneva drive may be well-suited, with modifications and new components, to provide a hard stop for a rotating joint.

The hard stop assembly 450 includes a Geneva body or member (or a driven wheel) 452 that with coupler 456 (e.g., axle, pin, or the like extending through a hole in the outer support 412) is pivotally supported on the outer support ring 412 and positioned adjacent the ring 412 and also the rotatable inner ring 420. When driven, the Geneva body 452 rotates about its rotation axis, $Axis_G$, extending along the longitudinal axis of the coupler 456. In FIG. 4, it can be seen that the Geneva body 452 includes at least one (but typically at least three) lobe or arm 454 each with an outward-facing contact or bearing surface 455, and the lobes or arms of the Geneva body 452 are separated by grooves or slots 458, 459 for receiving an engagement pin 480 on the inner ring 420.

The inner ring 420 includes a guide or track 470 on its second or lower surface 422 with a bearing or contact surface 472 for contacting the lobes or arms of the Geneva body 452. The hard stop assembly 450 is shown in FIG. 4 to be in the disengaged position in which the inner ring 420 is free to rotate 421 in either direction about its rotation axis on surface 413 of the outer support ring 412. In the disengaged position or state, the lobe or arm 454 of the Geneva body 452 is positioned so that its contact or bearing surface 455 is in abutting contact with the bearing or contact surface 472 of the guide or track 470 (e.g., the lobe or arm 454 slides or glides along the arcuate track or guide 470 during rotation 421 of the ring 420). In this way, the relative orientation of the Geneva body 452 is maintained relative to the center or rotation axis of the inner ring 420.

As shown in FIG. 4, the hard stop assembly 450 also includes a hard stop body 460 that is rigidly coupled to or integrally formed with the Geneva body 452. In this way, the hard stop body 460 is also pivotally coupled via the Geneva body 452 to the outer support ring 412 and such that, significantly, the hard stop body 460 rotates about the rotation axis, $Axis_G$, of the Geneva body 452 whenever the Geneva body 452 is rotated or driven. To engage or rotate the Geneva body 452, the hard stop assembly 450 includes an engagement pin 480 extending outward from the bottom or second surface 422 of the inner ring 420. Its use to drive the Geneva body 452 is discussed in more detail below, but, as can be seen, the pin 480 is provided on an arm or post 482 extending outward from a recessed surface or recess 484 in the guide or track 470 (with the recess 484 provided to provide a travel path for one of the lobe/arms such as lobe 454 of the Geneva body 452 to allow its rotation about axis, $Axis_G$, to reposition the hard stop body 460 into an engaged position or back to a disengaged position).

To halt further rotation of the inner ring 420, the hard stop assembly 450 further includes a pair of hard stop posts 490, 492 extending outward from the bottom or second surface 422 of the inner ring 420. The posts 490, 492 may be provided on the surface 422 inward toward the center of the inner ring 420 from the guide/track surface 472 so as to not contact the hard stop body 450 when the hard stop assembly 450 is disengaged. The posts 490, 492 are angularly offset from the engagement pin 480 such as by an angle, θ, chosen from the range of 1 to 360 degrees, with a range of 15 to 90 degrees being useful in some cases. The offset angle, θ, determines the magnitude of additional rotation 421 for the inner ring 420 after the engagement pin 480 drives or rotates the Geneva body 452 into an engaged position (as shown in FIG. 6).

The hard stop body 460 is shown to include first and second lobes or arms 462, 464 extending outward from the pivotal coupler 456 such as with a separation of 180 degrees (outward from opposite sides for the body 460). The hard stop arms 462, 464 each includes a contact or receiving surface 463, 465 for contacting or abutting one of the posts 490, 492 when the hard stop body 460 is in the engaged position and the inner ring 420 has completed a predefined amount of clockwise or counterclockwise rotation. With the hard stop assembly 450 in the disengaged position as shown in FIG. 4, the two arms 462, 464 are positioned so as to have their contact surfaces 463, 465 spaced apart a distance from the track/guide surface 472 on the inner ring 420 such that the hard stop posts 490, 492 can pass by the hard stop body 460 without interference for free rotation 421 (such as during a first revolution of the inner ring 420 and a percentage of a second revolution).

FIG. 5 illustrates the joint assembly 410 after the inner ring 420 has been rotated clockwise (or in a first direction) as shown with arrow 501 to reposition the Geneva body or driven wheel 452. As shown, the engagement pin 480 has engaged the Geneva body 452 by sliding into the groove or slot 458 (between two lobes or arms of the body 452). With further rotation of the inner ring 420 as shown, the pin 480 forces the Geneva body 452 to rotate 502 about the pivotal coupler 456 and its rotation axis, $Axis_G$. Rotation 502 is possible due to the combination of the pivotal coupling to the outer support ring 412 of the body 452 and the provision of the recessed surface 484 in the track surface 472 proximate or adjacent to the engagement pin 480 as a portion of the lobe/arm 454 is able to swing away from the track surface 472 into the recess 484. Also, as shown, the rigidly coupled (or integrally formed) hard stop body 460 also rotates 502 with the Geneva body or cam 452 such that the lobe or arm 462 is moved toward an engaged position.

FIG. 6 illustrates the joint assembly 410 after further clockwise rotation 501 of the inner ring 420 such that the engagement pin 480 disengages from the Geneva body 452 and moves out of the groove/slot 458 with additional rotation 501. As shown, the Geneva body 452 has been rotated about axis, $Axis_G$, to be in the engaged position (or the hard stop assembly 450 may be said to be in the engaged position to block or prevent over rotation of the inner ring 420 in the clockwise direction (or direction indicated by arrow 501)). Particularly, the first lobe or arm 454 has been rotated 90 degrees away from the guide surface 472 of the track/guide 470 of the inner ring 420, and a second lobe 654 (beneath the hard stop body 460 in FIG. 6) has been rotated 90 degrees from its disengaged position into the engaged position. In this position, the lobe/arm 654 of the Geneva body has its contact or bearing surface 655 proximate to or gliding on the track/guide surface 472 (note, the contact surface between elements 655 and 472 also maintains the position of the Geneva body 452), and the inner ring 420 can continue to rotate 501 an additional predefined rotation amount defined by the offset angle, θ, between the pin 480 and the post 492.

The hard stop body 460 rotates with the Geneva body 452 (to which it is rigidly coupled or, in other cases, the bodies 452 and 460 are formed as a single piece/component) into a corresponding engaged position. As shown, the arm or lobe 462 has swung downward toward the center of the inner ring 420 so as to extend over all of the bottom or second surface 422 of the inner ring 420 or at least so as to be in the path of the hard stop post 492 with further travel 501. Particularly, the contact or receiving surface 463 is positioned in the circular travel path of the hard stop post 492 such that if the inner ring 420 is rotated the whole offset angle, θ, (such as an angular rotation of 30 to 60 degrees or the like or a 1/12 to 1/6 revolution), the post 492 will come into contact the surface 463 of the hard stop body arm/lobe 462.

FIG. 7 illustrates the joint assembly 410 after such further rotation 501 has occurred such that the hard stop post 492 has come into contact with receiving or contact surface 463 of the hard stop arm/lobe 462 of the hard stop body 460. At this point in the operation of the joint assembly 410, the inner ring 420 is blocked or prevented by the hard stop assembly 450 from any further clockwise rotation 501 (or, more accurately, FIG. 7 could be drawn with a line through the arrow 501 or to indicate travel can only be in the counterclockwise direction). As shown, the Geneva body's arm/lobe 462 has its contact or bearing surface 463 in contact with the surface 472 of the guide/track 470. There is no recessed surface as was the case near engagement pin 480 such that the Geneva body 452 cannot rotate clockwise from the inner ring-engaged position of FIG. 7 when additional forces are applied by the post 492 on the surface 463 of the hard stop body arm/lobe 462 (note that rotation of the Geneva body 452 is prevented because surface 655 remains in contact with guide surface 472). In this manner, a hard stop is provided for the inner ring 420 for clockwise rotation 501 at some predefined magnitude greater than a single revolution (some additional angular rotation over 360 degrees is allowed prior to the hard stopped state shown in FIG. 7).

FIG. 8 is useful for showing that a similar hard stopped state is reached when the inner ring 420 is rotated a predefined amount more than 360 degrees in the counterclockwise direction as shown by arrow 801. To get to the illustrated state, the inner ring 420 is rotated 801 until the engagement pin 480 first engages the Geneva wheel 452 via the first groove 458 so as with additional rotation 801 the Geneva wheel or body 452 is rotated about its rotation axis, $Axis_G$, to move the Geneva body 452 back into the disengaged position or state shown in FIG. 4. Then, when the inner ring 420 is rotated a full revolution, the engagement pin 480 engages the Geneva body 452 via the second groove 459 to rotate the Geneva body 452 (and coupled hard stop body 460) about the rotation axis, $Axis_G$, to move the Geneva body 452 (and coupled hard stop body 460) into the engaged position shown in FIG. 8 (which shows further rotation 801 such that the engagement pin 480 has disengaged the Geneva body 452).

In this engaged position, the arm or lobe 854 of the Geneva body 452 is proximate to and typically in contact via its contact or bearing surface 855 with the surface 472 of the guide/track 470 on the bottom or second surface 422 of the inner ring 420. Since there is this contact and no recessed surface, the arm or lobe 854 cannot move away from the surface 472 of the guide/track 470 when, as shown, the hard stop post 490 is rotated 801 to abut the contact surface 855 of the arm 854 of the hard stop body 460. In this way, the joint assembly 410 has a hard stop that prevents further rotation 801 or over rotation at some point greater than 360 degrees in the counterclockwise direction, and movement is only allowed in the clockwise direction by the hard stop assembly 450.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The materials used for the various joint assembly components are not limiting and may include plastics, rubbers, metals, and the like. For example, the Geneva body may include more than 3 lobes (which may not be offset at 90 degrees), while other embodiments may include more lobes so as to allow more than two revolutions prior to hard stop engagement.

Prior mechanisms that allowed more than 360 degrees of rotation often included sliding components and/or slotted holes that allow two or more intermediate components to each rotate less than 360 degrees but in sum to a range larger than 360 degrees. The solution taught herein is based on or provides a new and unique use for a modified Geneva drive, and this solution is more compact than prior mechanisms and involves the use of fewer parts. The hard stop solution of the present description is versatile in that the hard stop pin/post can be set at various angles to provide a limit nearly anywhere in the range of 360 to 720 degrees (between one full revolution and two full revolutions).

I claim:

1. A rotating joint assembly, comprising:
   an outer support member;
   an inner joint member positioned centrally within the outer support member and pivotally coupled with the outer support member to be selectively rotated about a rotation axis passing through a center of the inner joint member; and
   a stop assembly including:
   a circular track, on a surface of the inner joint member, with a guide surface facing outward toward the outer support member;
   a Geneva drive body with three arms each with a contact surface for contacting the guide surface of the circular track and with adjacent pairs of the arms being separated by a slot in the Geneva drive body, wherein the Geneva drive body is pivotally coupled with the outer support member;
   a stop body with a pair of arms each with a contact surface, wherein the stop body is rigidly coupled to or integrally formed with the Geneva drive body;
   an engagement pin on the surface of the inner joint member positioned and configured to engage and rotate the Geneva drive body via the slots with rotation of the inner joint member; and
   a pair of stop posts angularly offset in opposite directions from the engagement pin by an offset angle, wherein the stop posts are each positioned and configured to physically abut the contact surface of one of the arms of the stop body during rotation of the inner joint member in a clockwise direction or a counterclockwise direction.

2. The assembly of claim 1, wherein the arms of the stop body are offset by 180 degrees and wherein the Geneva drive body is disposed between the stop body and the outer support member.

3. The assembly of claim 2, wherein the Geneva drive body is oriented relative to the stop body such that a first one of the arms of the Geneva drive body is positioned adjacent one of the arms of the stop body, a second one of the arms of the Geneva drive body is coupled to or integral with one of the arms of the stop body, and a third one of the arms of the Geneva drive body extends outward between the first and second arms of the Geneva drive body.

4. The assembly of claim 3, wherein the adjacent pairs of arms of the Geneva drive body are offset from each other by 90 degrees.

5. The assembly of claim 1, wherein the Geneva drive body is first positionable in a disengaged position with the contact surface of a middle one of the three arms contacting the guide surface and wherein, with the Geneva drive body in the disengaged position, the contact surfaces of the arms of the stop body are spaced apart from a travel path of the stop posts during rotation of the inner joint member.

6. The assembly of claim 5, wherein the Geneva drive body is second positionable in an engaged position with the contact surface of one of the outer two of the three arms contacting the guide surface and wherein, with the Geneva drive body in the engaged position, the contact surface of the one of the arms of the stop body is in the travel path of one of the stop posts during rotation of the inner joint member.

7. The assembly of claim 6, wherein the Geneva drive body is rotated into the engaged position by rotation of the inner joint member when the engagement pin rotates into one of the slots and wherein the guide surface of the circular track includes a recessed surface, proximate the engagement pin, for receiving a portion of one of the three arms of the Geneva drive body during the rotation of the Geneva drive body.

8. The assembly of claim 5, wherein the engagement pin and the hard stop posts are positioned at locations on the surface of the inner joint member whereby the Geneva drive body is positioned into the engaged position rotation in the range of 360 to 720 degrees of rotation of the inner joint member.

9. The assembly of claim 1, wherein each of the stop posts is angularly offset from the engagement pin by an offset angle in the range of 10 and 180 degrees.

10. A joint assembly with a hard stop to limit rotation, comprising:
an outer support ring;
an inner ring mounted on an inner surface of the outer support ring for rotation about a central axis extending through the inner ring; and
a stop assembly adapted to be in a disengaged state during a first revolution in either direction about the central axis and to be in an engaged stated after a predefined angular rotation after the first revolution in either of the directions,
wherein the stop assembly comprises a Geneva drive body pivotally mounted on the outer support ring and an engagement pin on a surface of the inner ring for rotating the Geneva drive body between the disengaged state and the engaged state during rotation of the inner ring,
wherein the stop assembly further comprises a pair of stop posts on the surface of the inner ring,
wherein the stop posts are angularly offset from the engagement pin, and
wherein at least one of the contact surfaces of the stop body is in a travel path of one of the stop posts when the stop assembly is in the engaged state.

11. The joint assembly of claim 10, wherein the stop assembly further comprises a stop body coupled to the Geneva drive body for rotation with the Geneva drive body, the stop body comprising a pair of contact surfaces spaced apart from a travel path of the engagement pin when the stop assembly is in the disengaged state.

12. The joint assembly of claim 10, wherein the Geneva drive body comprises a pair of outer lobes and a middle lobe extending outward between the pair of outer lobes, wherein the stop assembly further includes a track extending circularly on the surface of the inner ring, and wherein the middle lobe has a contact surface contacting the track when the stop assembly is in the disengaged state and one of the outer lobes has a contact surface contacting the track when the stop assembly is in the engaged state.

13. A joint assembly with a hard stop for limiting rotation after a full revolution, comprising:
an outer support ring;
an inner ring pivotally coupled with the outer support ring; and
a stop assembly including:
a circular track, on a surface of the inner ring, with a guide surface facing outward toward the outer support ring;
a Geneva drive body with arms with adjacent pairs of the arms being angularly offset, wherein the Geneva drive body is pivotally coupled with the outer support member;
a stop body with a pair of arms, wherein the stop body rotates with the Geneva drive body;
an engagement pin on the surface of the inner ring positioned and configured to engage and rotate the Geneva drive body between a disengaged position with a middle one of the arms of the Geneva drive body contacting the guide surface and one of two engaged positions with one of the arms other than the middle one of the arms of the Geneva drive body contacting the guide surface; and
a pair of stop posts each positioned on the surface of the inner ring so as to contact one of the arms of the stop body during rotation of the inner ring when the Geneva drive body is in the two engaged positions.

14. The assembly of claim 13, wherein the arms of the stop body are offset by 180 degrees.

15. The assembly of claim 13, wherein the Geneva drive body is disposed between the stop body and the outer support member.

16. The assembly of claim 13, wherein, with the Geneva drive body in the engaged position, one of the arms of the stop body is at least partially in a travel path of one of the stop posts during rotation of the inner ring.

17. The assembly of claim 13, wherein the guide surface of the circular track includes a recessed surface, proximate the engagement pin, for receiving a portion of any one of the arms of the Geneva drive body during the rotation of the Geneva drive body.

18. The assembly of claim 13, wherein the engagement pin and the stop posts are positioned at locations on the surface of the inner joint member whereby the Geneva drive body is positioned into the engaged position during rotation in the range of 360 to 720 degrees of rotation of the inner ring.

* * * * *